US006769012B1

(12) United States Patent
Liu et al.

(10) Patent No.: US 6,769,012 B1
(45) Date of Patent: Jul. 27, 2004

(54) METHOD AND SYSTEM FOR MANAGING MESSAGE TRANSACTIONS BETWEEN A SENDER AND RECIPIENT WITHIN A VIRTUAL MAILBOX

(76) Inventors: Song Liu, 10 Whispering Pines Way, Piscataway, NJ (US) 08854; Jon Song, 10 Whispering Pines Way, Piscataway, NJ (US) 08854; Herb Wang, 10 Whispering Pines Way, Piscataway, NJ (US) 08854

( * ) Notice: Subject to any disclaimer, the term of this patent is extended or adjusted under 35 U.S.C. 154(b) by 429 days.

(21) Appl. No.: 09/621,843

(22) Filed: Jul. 24, 2000

(51) Int. Cl.[7] ............................................... G06F 15/16
(52) U.S. Cl. ....................... 709/204; 709/205; 709/206; 345/752
(58) Field of Search ................................ 709/206, 205, 709/204; 345/752

(56) References Cited

U.S. PATENT DOCUMENTS

| | | | | |
|---|---|---|---|---|
| 5,819,032 A | * | 10/1998 | de Vries et al. ............. | 709/250 |
| 5,874,593 A | | 2/1999 | Ushio et al. | |
| 5,884,032 A | | 3/1999 | Bateman et al. | |
| 5,930,471 A | * | 7/1999 | Milewski et al. ............ | 709/204 |
| 5,930,479 A | | 7/1999 | Hall | |
| 5,956,390 A | * | 9/1999 | McKibben et al. .......... | 379/93.07 |
| 6,154,764 A | * | 11/2000 | Nitta et al. .................. | 709/200 |
| 6,161,149 A | * | 12/2000 | Achacoso et al. ............ | 710/4 |
| 6,185,551 B1 | * | 2/2001 | Birrell et al. .................. | 707/3 |
| 6,199,052 B1 | * | 3/2001 | Mitty et al. .................. | 705/75 |
| 6,275,811 B1 | * | 8/2001 | Ginn ............................ | 705/10 |
| 6,330,589 B1 | * | 12/2001 | Kennedy ..................... | 709/206 |
| 6,438,564 B1 | * | 8/2002 | Morton et al. .............. | 715/500 |
| 6,463,461 B1 | * | 10/2002 | Hanson et al. .............. | 709/204 |
| 6,484,196 B1 | * | 11/2002 | Maurille ...................... | 709/206 |
| 6,557,027 B1 | * | 4/2003 | Cragun ....................... | 709/204 |

OTHER PUBLICATIONS

Mosher, The Microsoft Exchange User's Handbook, Duke Press, 1997, pp. 14–17, 44–47, 232–235, 248–249, 280–281, 554–555.*

* cited by examiner

*Primary Examiner*—Glenton B. Burgess
*Assistant Examiner*—Bradley Edelman
(74) *Attorney, Agent, or Firm*—Michael I. Kroll

(57) ABSTRACT

The invention is a computerized message management system that provides a method and system whereby sender's of one or more messages and recipient's of one or more messages each having digital or analog communications equipment can access a virtual mailbox wherein sender's can enter messages and recipients's can receive messages. Both sender and recipient being the only parties having authorization to view said messages.

Furthermore, either the sender and/or recipient can reorder said messages without affecting the selective message structure of the other party.

10 Claims, 6 Drawing Sheets

| Message Titles (22) | Sender (14) | Date (26) |
|---|---|---|
| • Request for quote ～24 | John Doe | 3/23/2000 |
| └ Re: Request for quote ～24 | ABC Corp. | 3/24/2000 |
|   └ Do you offer column discount? ～24 | John Doe | 3/24/2000 |
|     └ Re: Do you offer column discount? | ABC Corp. | 3/25/2000 |
|       └ Get information, thank you ～24 | John Doe | 3/26/2000 |
| └ Availability and how to place an order? | John Doe | 3/24/2000 |
|   ├ Order information and instruction | ABC Corp. | 3/25/2000 |
|   └ Inventory and volume discount | ABC Corp. | 3/26/2000 |
|     └ Place an order based on quote | John Doe | 3/27/2000 |
| • Request for RMA | John Doe | 4/10/2000 |
| └ RMA Number AZ8370a | ABC Corp. | 4/11/2000 |
| • Make appointment to visit your office | John Doe | 5/05/2000 |
| └ Visitor direction to our office | ABC Corp. | 5/05/2000 |

20 { (group bracket for first thread)

FIG 2

| Message Titles | Sender | Date |
|---|---|---|
| • • • • • • • |  |  |
| • Request for quote | John Doe | 3/23/2000 |
|   ├ Re: Request for quote | ABC Corp. | 3/24/2000 |
|     └ Do you offer column discount? | John Doe | 3/24/2000 |
|       └ Re: Do you offer column discount? | ABC Corp. | 3/25/2000 |
|         └ Get information, thank you | John Doe | 3/26/2000 |
|   └ Availability and how to place an order? | John Doe | 3/24/2000 |
|     ├ Order information and instruction | ABC Corp. | 3/25/2000 |
| • • • └ Inventory and volume discount | ABC Corp. | 3/26/2000 |
|       └ Place an order based on quote | John Doe | 3/27/2000 |

| Message Titles | Sender | Date | Date |
|---|---|---|---|
| Request for quote (9 Messages) | John Doe | 3/23/2000 | Closed |
| Request for RMA (2 Messages) | John Doe | 4/10/2000 | Closed |
| Make appointment to visit ... (2 Messages) | John Doe | 5/05/2000 | Closed |

| Customer Request Category (25 Total) | Sender | Date | Date |
|---|---|---|---|
| Category 1. Place Order (5 threads) | | | |
| • • •   • • • | | | |
| Request for quote (9 Messages) | John Doe | 3/23/2000 | Closed |
| Buy HP Printer (3 Messages) ↘ 22 | Mary Doe | 2/12/2000 | Closed |
| • • •   • • • | | | |
|  | 14 | 26 | 27 |
| Category 3. Customer Returns (3 Threads ) | | | |
| • • •   • • • | | | |
| Request for RMA (2 Messages) ↘ 22 | John Doe | 4/10/2000 | Closed |
| • • •   • • • | | | |
|  | 14 | 26 | 27 |
| Category 20. Other Inquiry (1 Thread ) | | | |
| Make appointment to visit ... (2 Messages) ↘ 22 | John Doe | 5/05/2000 | Closed |
| • • •   • • • | | | |

METHOD AND SYSTEM FOR MANAGING MESSAGE TRANSACTIONS BETWEEN A SENDER AND RECIPIENT WITHIN A VIRTUAL MAILBOX

BACKGROUND OF THE INVENTION

1. Field of the Invention

The present invention relates generally to communications systems and, more specifically, to a method and system for managing message transactions between a sender and receiver having a virtual mailbox.

The system is comprised of at least one host computer and one or more software programs providing the functions of security, receiving transactions, notifying sender and/or receiver of outstanding messages, maintaining hierarchal structure, providing full text search and sender/receiver maintenance functions. The messages can be text, live chat or voice mail.

The sender posts a message to the receiver within the virtual mailbox. The receiver is notified of a message by the system through delivery of a URL (universal resource locator) pointing to the message. The user has the option of replying with a free form format or choosing one of a plurality of pre-defined category responses. When the receiver replys to the message, the response is automatically linked to the sender's message and stored in an initial hierarchical structure.

In addition the present invention takes into account that a normal topic of conversation can span months while other conversations are running concurrently. While chat rooms permit a participant to reply to any message with the message linked by being a reply to any other message. This is not always the case in normal conversation. As an example, when ordering from e-commerce, after the initial flurry of messages to figure out how the system works, the process is usually boiled down to ordering, payment, shipping, tracking and hopefully the occasional RMA (Return Merchandise Authorization). These processes are heavily intermingled. One order is being sent before another has shipped and your credit card has been double billed for yet another. The normal sequential ordering of e-mail by date results in a lot of time trying to make sense of which e-mail belongs to what order. Although users are provided with the function of cataloging e-mails into various folders, this is certainly impractical over the long period considering 50 to 100 purchases.

Also, cataloged messages are stored parallel to each other in folders, which does not preserve or establish hierarchical relationship among messages.

The solution, as proposed by the present invention, is to provide the user with a drag and drop function that provides means for reorganizing messages into new threads, attaching one set of messages into an existing thread, and rebuilding the relationship based on user defined logic.

An RMA for an order last month could be dragged and dropped on the relevant order. The system will reorganize the message hierarchy creating a new message thread for a particular order for later review. Thereby, creating a so-called paper trail by order.

2. Description of the Prior Art

There are other message notification systems designed for maintaining a real time hierarchal structure. Typical of these is U.S. Pat. No. 5,874,953 issued to Webster et al. on Feb. 23, 1999.

Another patent was issued to Bateman et al. on Mar. 16, 1999 as U.S. Pat. No. 5,884,032. Yet another U.S. Pat. No. 5,930,471 was issued to Milewski et al. on Jul. 27, 1999 and another was issued to Hall on Jul. 27, 1999 as U.S. Pat. No. 5,930,479.

U.S. Pat. No. 5,874,593

Inventor: Roger Webster, et al

Issued: Feb. 23, 1999

A method and apparatus summarizes information in an easy and user-friendly format in a database that stores topics and responses to those topics. To that end, the database may be accessed by a GUI having an outline view that lists each of the responses under a topic in outline form, and an adjacent response chain view having indicia for accessing the content of each response in a response chain to a selected response. A response may either be a response to a topic (topic response) or a response to a previously posted response (reply response). The response chain therefore includes a selected response and any other responses that are directly linked, by responses, between the selected response and the topic.

U.S. Pat. No. 5,884,032

Inventor: Thomas Howard Bateman et al.

Issued: Mar. 16, 1999

This invention (The Customer Contact Channel Changer) enables the integration of different Customer Contact Channels such as live call center ACD (Automatic Call Distribution) agents, ADSI (Analog Display Services Interface) enhanced IVR (Interactive Voice Response) systems and WWW (World Wide Web) servers.

The world wide web servers are used to allow customers with computer equipment to access information from an organizations databases in a self service mode. Frequently these customers have questions best answered by human ACD agents. With this invention the connection between the customer with the question and the agent with the answer is done quickly and efficiently with both parties sharing screens of common information. Also control is retained by the customer to make the call happen when they want it.

U.S. Pat. No. 5,930,471

Inventor: Allen E. Milewski et al.

Issued: Jul. 27, 1999

A communications system facilitates transactions between a sender and a plurality of recipients as part of an electronic messaging system. Messaging means enable a sender to form an electronic template containing a message in the form of a structured response object for a recipient as part of a transaction between a sender and a recipient(s). Controller means receive and store the message in a virtual mailbox assigned to the transaction for access by the sender and the recipient(s). The controller means generate and send to the recipients an indicator or pointer identifying the message at an address for the virtual mailbox. The recipient(s) use the pointer address to view the electronic message in the form of a structured object response at the virtual mailbox in the controller. The recipient may ignore or file the message or send a response to the virtual mailbox. The response or lack of response to the structure object response by the recipient (s) is tracked and recorded by the controller. The status of the transaction is updated as reflected by the structured object response (s) summarized for display by the controller upon inquiry by the sender. A reminder of a response due to a transaction is sent by the controller to the recipient(s) when selected from the summary display by the sender. When the transaction between the sender and recipient(s) ends, for one reason or another, the electronic message is erased from the virtual mailbox.

U.S. Pat. No. 5,930,479

Inventor: Hall

Issued: Jul. 27, 1999

A system and method is provided for sending and receiving authorized messages from a sender to a recipient in a network. The method and system makes use of a channelized address to send the message from the sender to the recipient. The channelized address comprises a common address portion that indicates the identity of the recipient in the network and a channel identifier portion for verifying that the message is authorized for delivery to the recipient.

While these communication systems may be suitable for the purposes for which they were designed, they would not be as suitable for the purposes of the present invention, as hereinafter described.

SUMMARY OF THE PRESENT INVENTION

A primary object of the present invention is to provide a secure virtual mailbox between two users.

Another object of the present invention is to eliminate the need for each party to maintain duplicate information. One message will be owned by two parties and will not be deleted until both parties consent to said action but will be viewable only to those that have not deleted the message.

Yet another object of the present invention is to provide a structured format for the exchange of messages having predefined response status available whereby one party can see that the other party has viewed the message.

Still yet another object of the present invention is to provide a notification system which can be viewed by either party. When a message has been sent the status of the message is open. When the recipient clicks on the message URL the status will change to viewed.

Yet another object of the present invention is to provide a storage and message exchange mechanism that maintains a hierarchical structure of messages between a sender and receiver.

Still yet another object of the present invention is to provide a virtual mailbox having full text search and predefined viewing options, such as recipient's view of one sender's communication history.

Another object of the present invention is to provide a virtual message center wherein the order or relationship of the messages can be redefined or re-built by the sender for the sender's purposes or redefined by the receiver for the receiver's purposes without affect the display order for the other party.

Additional objects of the present invention will appear as the description proceeds.

The present invention overcomes the shortcomings of the prior art by providing a virtual mailbox which will eliminate redundant information. It will also provide means whereby the send/receiver can perform full text search and will provide means whereby sender and receiver may order the messages in whatever logical progression is suitable without impacting the other parties order.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

LIST OF REFERENCE NUMERALS UTILIZED IN THE DRAWINGS

10 system for managing message transactions between a sender and recipient within a virtual mailbox
12 virtual mailbox
14 communication
16 sender
18 recipient
20 thread
22 message title
24 message
26 message date
27 message status
28 detailed sender recipient message hierarchial disply
30 sender recipient thread display
32 sender recipient message title display
34 sender recipient category display

BRIEF DESCRIPTION OF THE DRAWINGS

In order that the invention may be more fully understood, it will now be described, by way of example, with reference to the accompanying drawings in which.

DETAILED DESCRIPTION OF THE PREFERRED EMBODIMENT

Turning now descriptively to the drawings in which similar reference characters denote similar elements throughout the drawing figures. FIG. 1 through FIG. 8 illustrate the Internet accessible computer based licensed broker/auctioneer management system of the present invention indicated generally by the numeral 10.

Figure 1:
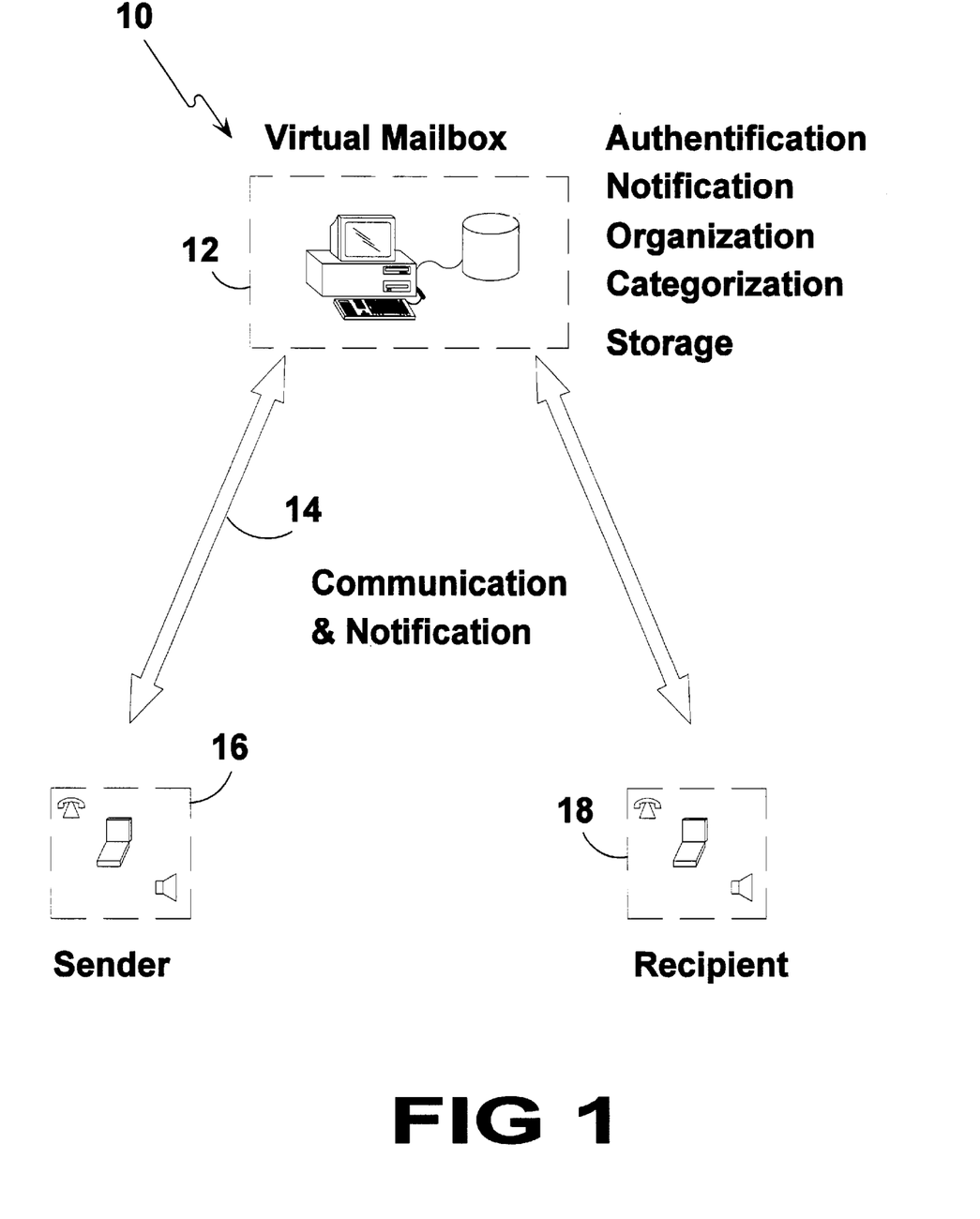
FIG. 1 is an illustrative view of the present invention. Shown is a host computer performing the function of virtual mailbox having one or more software programs wherein a sender can post messages and a recipient can review messages.

Referring to FIG. 1, shown is a message handling system. The message handling system is comprised of a sender (16) having means for generating at least one message for a recipient (18) using digital or analog equipment. One or more host computers, serving as virtual mailbox (12), having means for establishing a communications link between a plurality of users, having means for storing and retrieving messages and a recipient (18) having means for receiving at least one message from a sender (16) using digital or analog equipment. The virtual mailbox (12) will perform the functions of authentification, notification, organization, categorization and storage of messages. The function of authentification is comprised of verifying that the sender (16) and/or recipient (18) are the only parties that can view their messages. The function of notification is comprised of notifying parties that there is at least one message in their inbox. The function of organization is comprised of maintaining a hierarchial structure of messages between a sender (16) and recipient (18). The function of categorization is comprised of grouping messages under a common heading. The function of storage is comprised of writing messages to a read/writable data storage medium.

A sender (16) posts at least one message for a recipient (18) and/or recipients using sender's digital or analog equipment. The recipient and/or recipients can retrieve their messages using recipient's digital or analog equipment. The virtual mailbox (12) maintains a hierarchial history of messages between said sender (16) and said recipient (18), that can be viewed only by said sender (16) and/or said recipient (18). The historical hierarchial structure of the messages can be reordered to suit the needs of each party without reordering the historical hierarchial message structure of the other party.

Furthermore, threads, which are comprised of new subject matter and all related replies, can be moved to an existing thread or parts thereof can be redefined as new threads.

Figure 2:
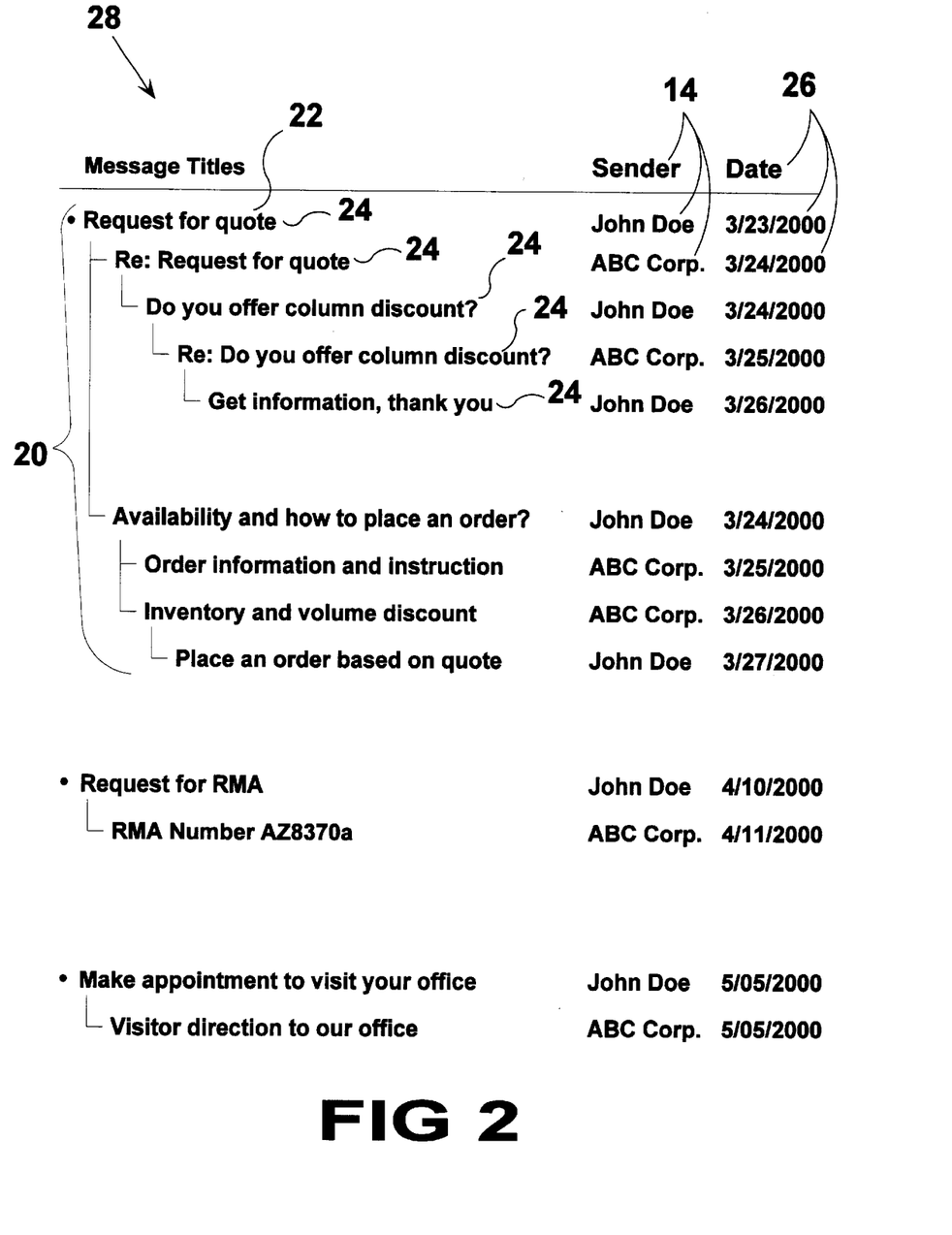
FIG. 2 is an illustrative view, for the purposes of demonstration, of a sender and recipient's messages comprised of three threads and related messages.

Referring to FIG. 2, shown are a plurality of messages between a sender (16) and recipient (18). All of the messages are maintained in a hierarchial structure having an initial message of new subject matter and a plurality of replies. Each new subject matter and related replies forms a thread. This view is a demonstration of the virtual mailbox (12) default method of maintaining new subject matter and related replies as they are initiated by sender (16) and/or recipient (18).

While this format is well known within chat session, it is not conductive to ongoing conversations where additional topics can be related to earlier topics. It does provide a quick overview of messages and associated replies.

It is an object of the present invention that a sender (16) or receiver may reorder threads and replies into new threads. As an example, the sender (16), an end user of computer equipment, and the recipient (18), a supplier of computer equipment, may want to order their e-mail according to divergent subject matter. The sender (16) may want all vendor related messages to occur under a single thread from purchasing to return merchandise authorization (RMA). While, the recipient (18) may want to group all purchases together and all RMA's together. The present invention provides for this by providing means wherein sender (16) and receiver can reorder their messages according to their own needs without affecting the order of the other party.

Figure 3:
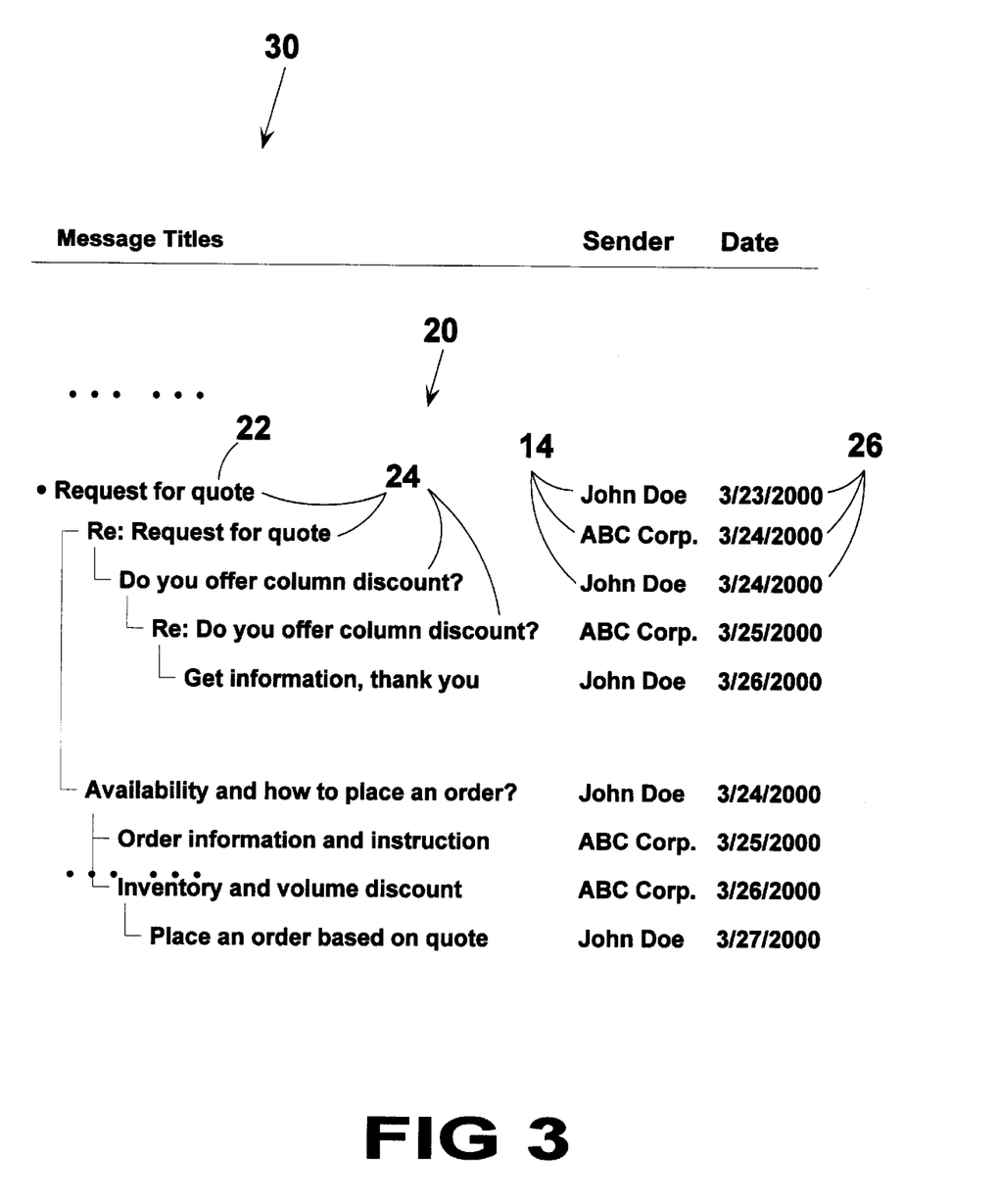
FIG. 3 is an illustrative view for demonstration purposes of a single thread, as shown in FIG. 2, viewable by sender or recipient.

Referring to FIG. 3, as shown in FIG. 2, the sender (16) and/or recipient (18) can view all correspondence maintained within the virtual mailbox (12) for a user. The virtual mailbox (12) provides means where sender (16) and/or recipient (18) can view a single thread. Since the sender and/or recipient (18) have the option of reordering messages within an existing thread or creating new threads using replies from other threads, the hierarchial structure for similar subject matter between a sender (16) and recipient (18) can be markedly different.

While this is a departure from the prior art, it conforms more closely to the time honored paper trail that has proved its worth over time. Normal communications between two parties, either digital, analog or text document, has always been based on a protocol wherein the author identify who the message is intended for, date of the message and text or graphical image representing the body of the message.

How sender (16) and/or recipient (18) files historical documents is relevant to the other party. It is up to each party to catalog their documents in whatever relevant format they deem prudent. It is the primary object of the present invention to provide means for each party to organize their respective interparty communications in whatever hierarchy they deem prudent.

Figure 4:
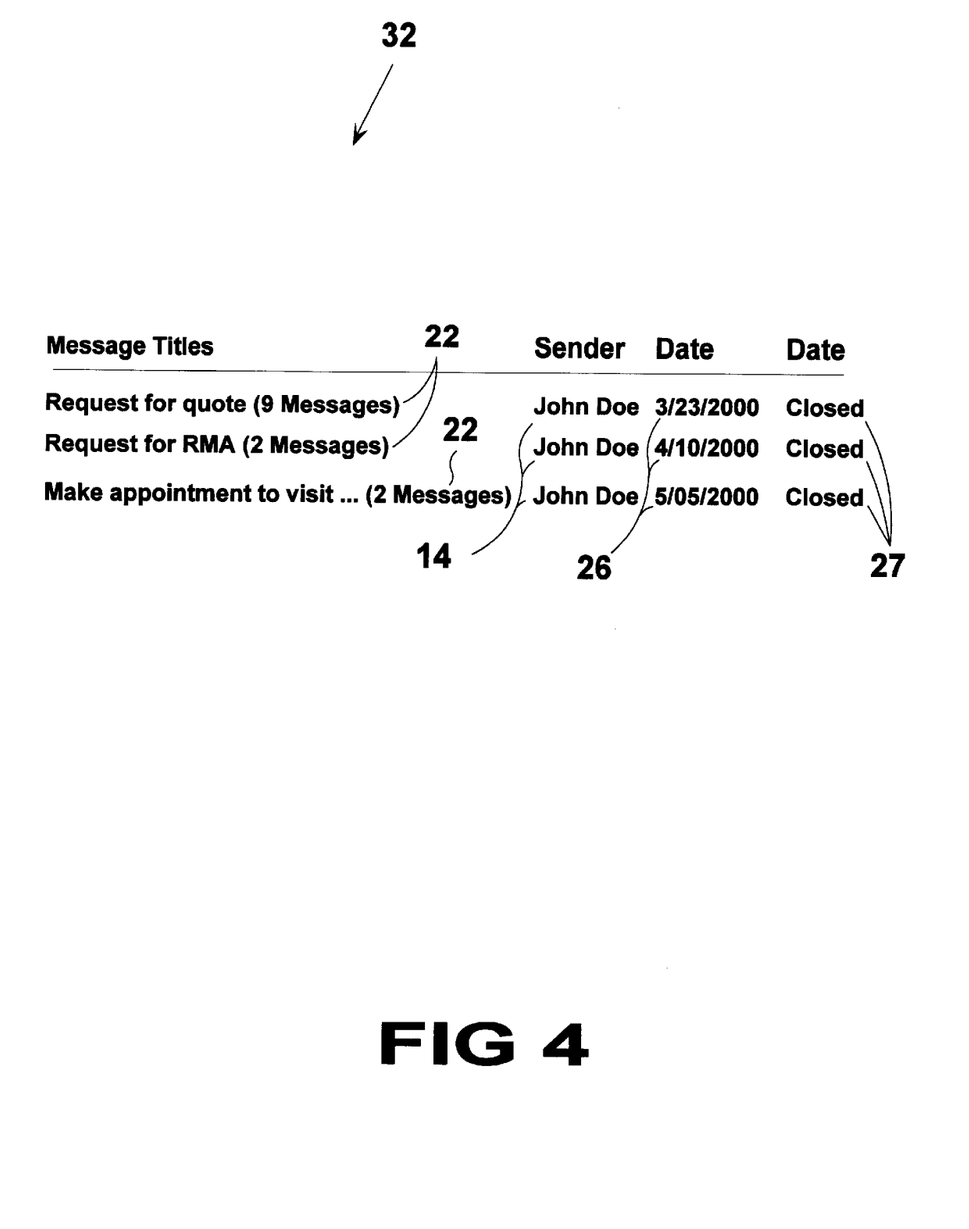
FIG. 4 is an illustrative view provided by the present invention whereby sender or recipient can view a synopsis of message threads.

Referring to FIG. 4, shown is one means provided by the present invention whereby sender (16) or recipient (18) can select to view message threads. This provides a quick overview of the communications between the two parties without having to view all the related messages. The thread heading is display along with the number of related messages. Also displayed is the author of the thread, the date of the original thread and the status of the thread. The status of the thread is determined closed if all related messages have been viewed by the respective parties. Not all messages require an answer. It may be sufficient information for the sender of a message to know that the other party view the message. In which case, the recipient (18) of a message can change the status to closed and the sender (16) will be notified of the event.

Figure 5:
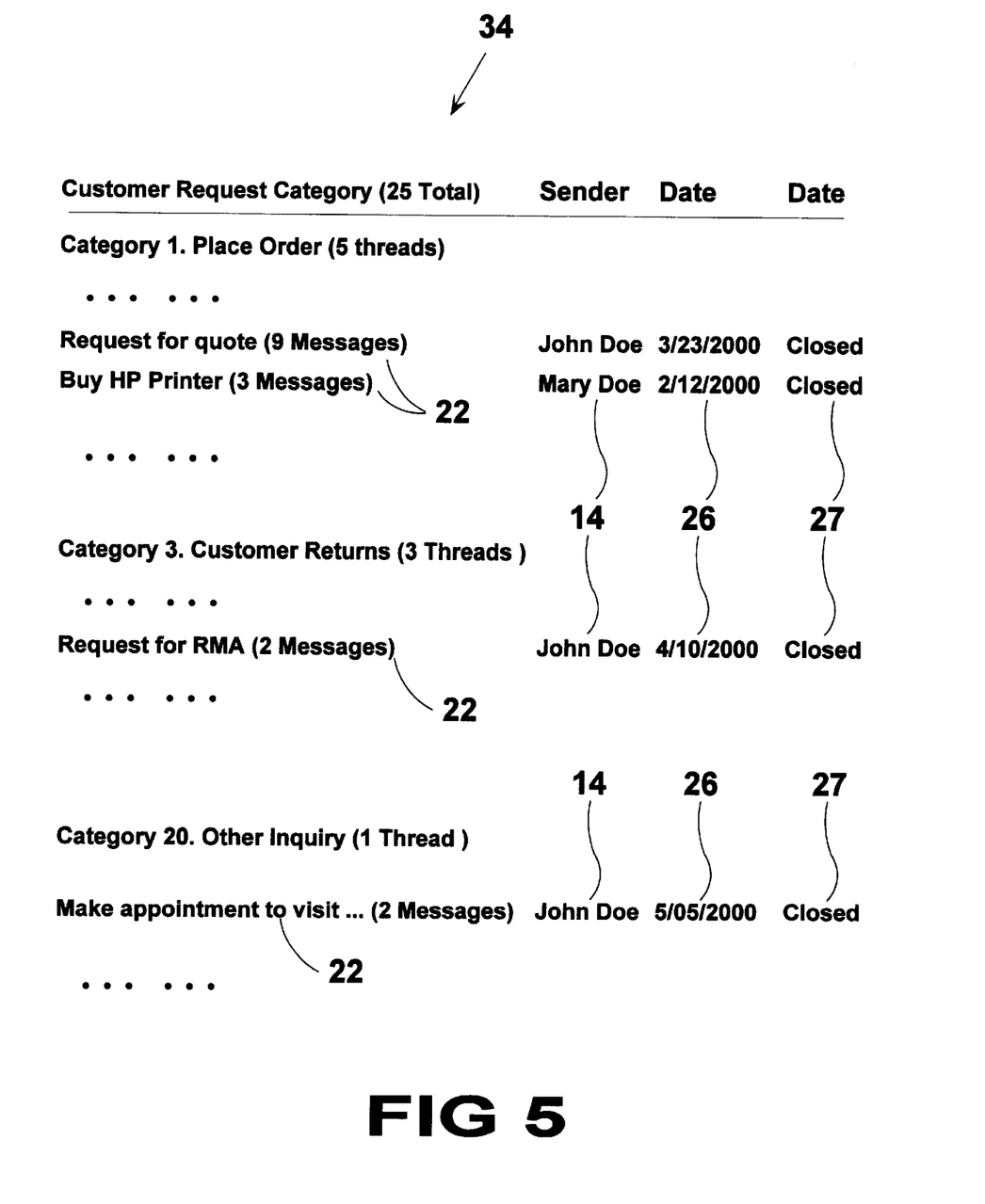
FIG. 5 is an illustrative view, for demonstration purposes, of the virtual mailbox option whereby a sender and/or recipient can view all correspondence using a plurality of predefined categories.

Referring to FIG. 5, shown is the virtual mailbox (12) option of viewing all correspondence using a plurality of predefined categories. The system will display a category heading and the number of threads contained within each category. Displayed after the category heading is a detailed list comprised of the thread title, number of messages within a thread, author of the thread, initial date of the thread, and status of the thread.

Figure 6:
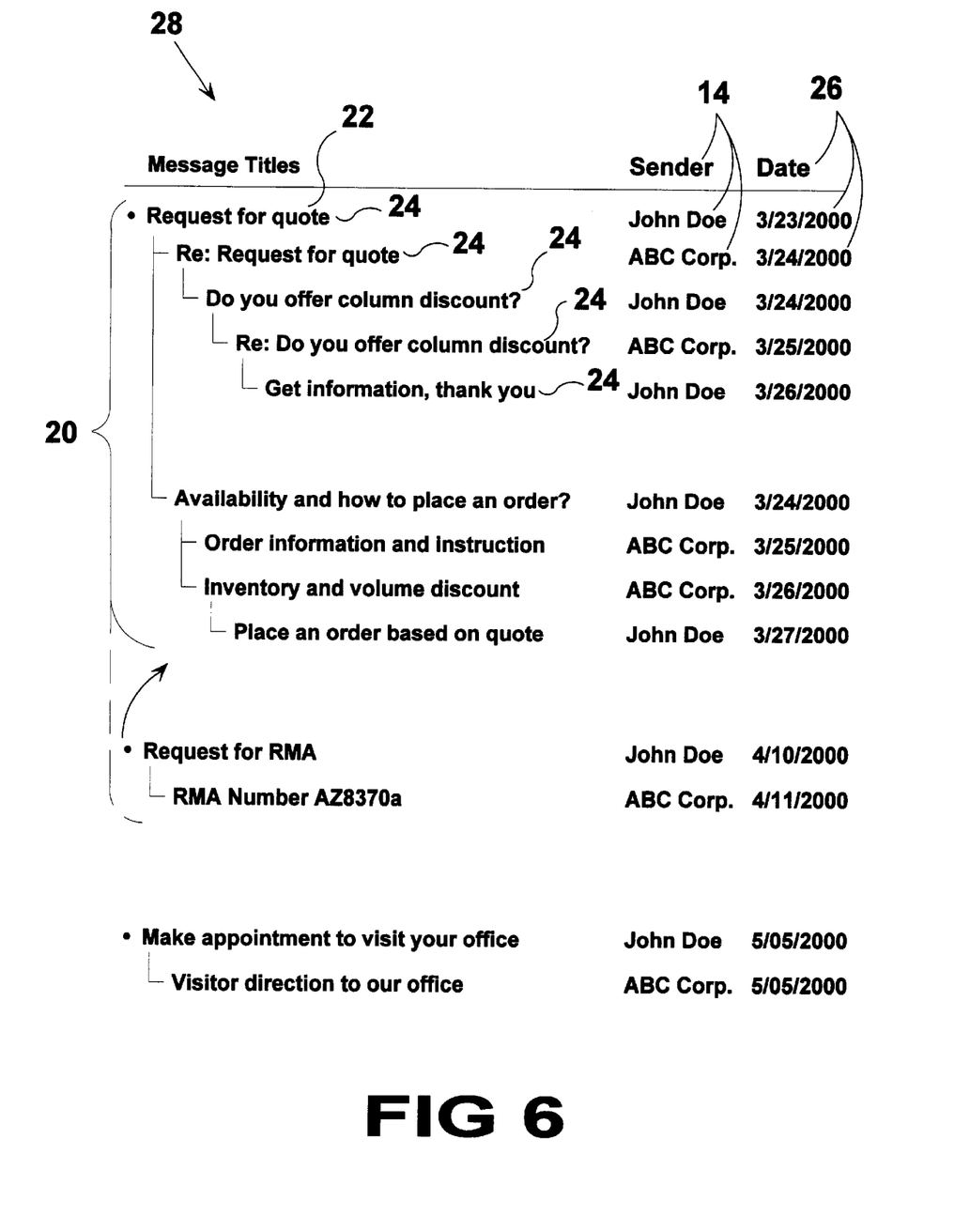
FIG. 6 is an illustrative view, for demonstration purposes, of a thread being moved by sender and/or recipient to another thread.

Referring to FIG. 6, shown is a detailed list of threads and related messages. Each thread header has a hierarchial view of related messages. The three threads having one or more attached messages. The thread "Request for RMA" and associated messages will be selectively moved to the thread "Request for quote". In this case, when a thread header is moved all related messages are also moved. The virtual mailbox (12) will reorganize the user's messages. The thread header "request for quote" will now have 2 additional messages. The number of threads for this sender (16)/recipient (18) will be decreased by one only for the user that initiated the reorganization. This selective reorganization by one user does not affect the view of the other user.

It should be noted that only the organizational positioning of the prior RMA thread has changed. The message header, author, date and status have not changed. All related messages continue to be linked to the original message.

What is claimed is new and desired to be protected by letters patent is set forth in the appended claims:

1. A data processing system utilizing a virtual mailbox for managing messages between a sender and recipient, the system comprising:
   a) means for receiving messages;
   b) means for storing messages;
   c) means for retrieving messages;
   d) means for transmitting messages;
   e) means for authenticating access;
   f) means for reordering messages into a new hierarchal structure within said virtual mailbox to suit the needs of either said sender or recipient without reordering the hierarchal structure of the recipient or sender, respectively, eliminating the need for each of the sender or recipient to maintain duplicate information; and
   g) deletion of said messages requiring consent of both the sender and recipient.

2. The system of claim 1 in which a user is provided with a drag and drop function that provides means for reorganizing messages into new threads, attaching one set of messages into an existing thread, and rebuilding a relationship based on user defined logic, a thread comprising new subject matter and all related replies.

3. The system of claim 1, wherein sending of message data includes posting a URL (Universal Resource Locator) accessible to recipient of message data.

4. A method for managing messages between a sender and recipient in a virtual mailbox, the method comprising the steps of:
   a) receiving messages;
   b) storing messages;
   c) receiving messages;
   d) transmitting messages;
   e) authenticating access;
   f) said sender or recipient reordering messages within said mailbox into a new hierarchal structure without reordering the hierarchal structure of the recipient or sender, respectively, eliminating the need for each of the sender or recipient to maintain duplicate information; and
   (g) deletion of messages requiring consent of both the sender and recipient of said messages.

5. The method of claim 4 wherein sending of message data includes a method for posting a URL (Universal Resource Locator) accessible to recipient of message data.

6. The method of claim 4 in which a user uses a drag and drop function for reorganizing messages into new threads, attaching one set of messages into an existing thread, and rebuilding a relationship based on user defined logic, a thread comprising new subject matter and all related replies.

7. A data processing system comprising:
   a) a virtual mailbox for receiving, storing, retrieving and transmitting messages on behalf of users comprising senders and recipients;
   b) said mailbox maintaining a hierarchal history of messages between a sender and a recipient that can be viewed only by the sender and the recipient; and
   c) means in said mailbox allowing the historical hierarchal structure of messages between users to be maintained by each user in said virtual mailbox in a format selected by each user without affecting the format of the other user, deletion of messages requiring consent of both the sender and recipient, thereby eliminating any need for each of the users to maintain duplicate information.

8. The data processing system of claim 7 in which the messages stored in said mailbox are arranged according to threads, each thread comprising new subject matter and all related replies.

9. The data processing system of claim 8 in which a thread can be moved to an existing thread and parts of a thread can be redefined as new threads.

10. The data processing system of claim 9 in which a sender or a recipient can access said mailbox using digital or analog equipment.

* * * * *